(12) United States Patent
Kondou et al.

(10) Patent No.: US 10,393,963 B2
(45) Date of Patent: Aug. 27, 2019

(54) COMPOSITION FOR OPTICAL WAVEGUIDE, DRY FILM FOR OPTICAL WAVEGUIDE AND OPTICAL WAVEGUIDE USING EPOXIES

(71) Applicant: PANASONIC INTELLECTUAL PROPERTY MANAGEMENT CO., LTD., Osaka (JP)

(72) Inventors: Naoyuki Kondou, Osaka (JP); Shinji Hashimoto, Osaka (JP); Toru Nakashiba, Osaka (JP); Shingo Maeda, Osaka (JP); Seiji Takagi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/273,925

(22) Filed: Feb. 12, 2019

(65) Prior Publication Data

US 2019/0212495 A1 Jul. 11, 2019

Related U.S. Application Data

(63) Continuation of application No. 15/749,525, filed as application No. PCT/JP2016/003813 on Aug. 23, 2016, now Pat. No. 10,247,883.

(30) Foreign Application Priority Data

Sep. 1, 2015 (JP) .................................. 2015-171641

(51) Int. Cl.
*G02B 6/132* (2006.01)
*C08L 63/08* (2006.01)
(Continued)

(52) U.S. Cl.
CPC .............. *G02B 6/132* (2013.01); *C08L 63/00* (2013.01); *C08L 63/08* (2013.01); *G02B 1/10* (2013.01); *G02B 6/12* (2013.01); *G02B 6/1221* (2013.01)

(58) Field of Classification Search
CPC ........ G02B 6/132; G02B 6/12; G02B 6/1221; G02B 1/10; C08L 63/08; C08L 63/00
See application file for complete search history.

(56) References Cited

U.S. PATENT DOCUMENTS 6,990,263 B2    1/2006  Shimizu
7,327,821 B2 *  2/2008  Ishihara ................. G21F 1/103
                                                    376/272

(Continued)

FOREIGN PATENT DOCUMENTS

JP    2001-343539    12/2001
JP    2013-257403    12/2013
JP    2015-129288    7/2015

OTHER PUBLICATIONS

International Search Report of PCT application No. PCT/JP2016/003813 dated Nov. 22, 2016.

*Primary Examiner* — Andrew Jordan
(74) *Attorney, Agent, or Firm* — Greenblum & Bernstein, P.L.C.

(57) ABSTRACT

A composition for an optical waveguide is cured into a sheet to give a cured product. A difference in light transmittance with respect to light having a wavelength of 450 nm is 15% or less between this cured product and this cured product after retention in atmosphere at 175° C. for 40 hours, the light transmittance being calculated in terms of the cured product at a thickness of 50 μm.

7 Claims, 2 Drawing Sheets

(51) Int. Cl.
*G02B 1/10* (2015.01)
*C08L 63/00* (2006.01)
*G02B 6/122* (2006.01)
*G02B 6/12* (2006.01)

(56) References Cited

U.S. PATENT DOCUMENTS

| | | |
|---|---|---|
| 8,362,690 B2 | 1/2013 | Son |
| 9,035,009 B2 | 5/2015 | Manabe et al. |
| 9,416,231 B2 | 8/2016 | Manabe et al. |
| 9,777,138 B2 * | 10/2017 | Okada .................... C07C 69/96 |
| 10,103,353 B2 | 10/2018 | Cho |
| 10,202,493 B2 * | 2/2019 | Murakami ......... C08G 73/1035 |
| 2004/0252932 A1 * | 12/2004 | Shimizu ............... G02B 6/1221 385/14 |
| 2005/0157833 A1 | 7/2005 | Ishihara |
| 2009/0029623 A1 | 1/2009 | Son |
| 2010/0099790 A1 * | 4/2010 | Manabe ................... C07F 7/21 522/172 |
| 2013/0165611 A1 | 6/2013 | Manabe et al. |
| 2015/0218318 A1 | 8/2015 | Manabe et al. |
| 2015/0218319 A1 | 8/2015 | Manabe et al. |
| 2016/0152773 A1 * | 6/2016 | Murakami ......... C08G 73/1035 522/170 |
| 2017/0291984 A1 * | 10/2017 | Hirayama ............. C08G 59/68 |
| 2018/0224604 A1 | 8/2018 | Kondou |
| 2018/0342687 A1 | 11/2018 | Yoo |

* cited by examiner

COMPOSITION FOR OPTICAL WAVEGUIDE, DRY FILM FOR OPTICAL WAVEGUIDE AND OPTICAL WAVEGUIDE USING EPOXIES

CROSS-REFERENCE TO RELATED APPLICATIONS

The present application is a Continuation of U.S. application Ser. No. 15/749,525, filed Feb. 1, 2018, which is a National stage of International Patent Application No. PCT/JP2016/003813, filed Aug. 23, 2016, which claims priority to Japanese Application No. 2015-171641, filed Sep. 1, 2015. The disclosures of application Ser. No. 15/749,525 and International Patent Application No. PCT/JP2016/003813 are incorporated by reference herein in their entireties.

TECHNICAL FIELD

The present invention relates to a composition for an optical wave guide, a dry film for an optical wave guide, and an optical wave guide.

BACKGROUND ART

High-speed transmission is required in long-distance and middle-distance communication fields, specifically, an FTTH (Fiber to the Home) field and an in-vehicle field, for example. In order to attain the high-speed transmission, an optical fiber cable is used as a transmission medium. Further, high-speed communication is being required also in short-distance communication, e.g., communication within 1 m. In a field of such short-distance communication, performance is also required that is unattainable with the optical fiber cable. Specific examples of the required performance include high density wiring such as a narrow pitch, junction, intersection, and multilayering, surface mounting, integration with an electrical circuit substrate, and bending at a small curvature radius. As one that satisfies these requirements, an optical wiring board is considered to be used that includes an optical waveguide.

Such an optical wiring board is preferred to include, for use of light input and output from the optical waveguide, photoelectric conversion elements such as a light emitting element (e.g., a vertical cavity surface emitting laser (VCSEL)) and a light receiving element (e.g., a photo diode (PD)), and a semiconductor element such as an integrated circuit (IC). In order to drive these elements, it is necessary to provide an electric circuit on, for example, the optical wiring board. Thus, preferred is a photoelectric composite wiring board on which not only an optical waveguide but also an electric circuit is provided.

Such a photoelectric composite wiring board is used not only in place of a printed wiring board (PWB) but also, for example, as a photoelectric composite flexible wiring board that is bendable. Such a photoelectric composite flexible wiring board can be used in place of, for example, a flexible wiring board disposed across a hinge of a compact terminal device, and is drawing attention.

As a material used for forming the optical waveguide, for example, an acrylic resin is known that is widely used for producing an optical fiber. The optical waveguide made of an acrylic resin, however, does not have heat resistance high enough for allowing heat conditions for forming an electric circuit, for example, reflow conditions of lead-free solder at a high temperature. Thus, it is impossible to apply a mounting step including a reflow step, for a case of forming an optical waveguide on a substrate with use of an acrylic resin and further mounting various elements such as a photoelectric conversion element. Therefore, in a case of using such an optical waveguide, it is necessary to dispose the optical waveguide on, for example, a separate substrate on which various elements have been mounted in advance, while accurately positioning a core of the optical waveguide in the order of tens of micrometers. Such a mounting step is so complicated that productivity is limited.

For the reasons described above, a material other than the acrylic resin is required as the material for forming the optical waveguide. Examples of the material other than the acrylic resin include materials described in Patent Literatures 1 and 2.

Patent Literature 1 discloses, as a material used for a core and a clad portion of an optical waveguide element, a polymerizable mixture that includes a mixture containing a reactive oligomer such as an oxetane, and a polymerization initiator capable of initiating polymerization of the mixture with heat or light.

Patent Literature 2 discloses a resin composition for an optical waveguide that contains, as essential components, a cyanate ester prepolymer, a sulfur atom-containing compound, an acrylate monomer, and a photoradical polymerization initiator.

Patent Literature 1 describes that a high-quality optical waveguide element is easily attained. Patent Literature 2 describes that it is possible to provide an optical waveguide that has high heat resistance and a small light transmission loss at a practical level and is thus excellent in physical properties.

The optical waveguide is being required to have higher heat resistance. Specifically, in a case of forming an optical waveguide and then forming an electric circuit, as described above, the optical waveguide is being required to have heat resistance high enough for allowing heat generated when the electric circuit is formed, for example, heat resistance high enough for allowing reflow conditions of lead-free solder at a high temperature.

For the reason described above, a material is required that gives an optical waveguide having higher heat resistance. Specifically, a material is required that gives an optical waveguide higher in heat resistance than optical waveguides formed with use of the materials described in Patent Literatures 1 and 2.

CITATION LISTS

Patent Literatures

PTL 1: Unexamined Japanese Patent Publication No. 2001-343539
PTL 2: Unexamined Japanese Patent Publication No. 2013-257403

SUMMARY OF THE INVENTION

The present invention has been made in view of the circumstances described above, and an object of the present invention is to provide a composition for an optical waveguide and a dry film for an optical waveguide that can produce an optical waveguide high in heat resistance. Another object of the present invention is to provide an optical waveguide high in heat resistance.

Various studies have been conducted for heat resistance of the optical waveguide, and it has been found that when an optical waveguide low in heat resistance is heated, light transmittance sometimes lowers with respect to visible light in a blue region, for example, light having a wavelength of 450 nm. Based on this finding, the present invention has been achieved as follows.

The composition for an optical waveguide according to the present invention is cured into a sheet to give a cured product. A difference in light transmittance with respect to light having a wavelength of 450 nm is 15% or less between this cured product and this cured product after retention in atmosphere at 175° C. for 40 hours, the light transmittance being calculated in terms of the cured product at a thickness of 50 µm.

Such a set difference can provide a composition for an optical waveguide that can produce an optical waveguide high in heat resistance.

According to the present invention, there can be provided the composition for an optical waveguide and the dry film for an optical waveguide that can produce an optical waveguide high in heat resistance. According to the present invention, there can also be provided the optical waveguide high in heat resistance.

DESCRIPTION OF EMBODIMENTS

Hereinafter, exemplary embodiments according to the present invention are described. The present invention is not limited to these exemplary embodiments.

A composition for an optical waveguide according to one exemplary embodiment of the present invention is a composition that is cured into a sheet to give a cured product, light transmittance of the cured product satisfying a following relationship. Specifically, the composition for an optical waveguide according to the exemplary embodiment is a composition that is cured into a sheet to give a cured product having a difference in light transmittance of 15% or less with respect to light having a wavelength of 450 nm between the cured product and the cured product after retention in atmosphere at 175° C. for 40 hours, the light transmittance being calculated in terms of the cure product at a thickness of 50 µm. The light transmittance of the cured product after retention in atmosphere at 175° C. for 40 hours is in many cases lower than the light transmittance of the cured product before the retention. Thus, preferred to be 15% or less is a value obtained by deducting, from the light transmittance of the cured product with respect to light having a wavelength of 450 nm, the light transmittance of the cured product after retention in atmosphere at 175° C. for 40 hours, the cured product being obtained by curing the composition for an optical waveguide into a sheet, and the light transmittance being calculated in terms of the cured product at a thickness of 50 µm.

As described above, the optical waveguide low in heat resistance sometimes decreases the light transmittance with respect to light having a wavelength of 450 µm, when heated. In contrast, the cured product obtained from the composition for an optical waveguide according to the present exemplary embodiment suppresses a decrease of light transmittance with respect to light having a wavelength of 450 nm, even when heated. For the reasons described above, production of an optical waveguide with use of this composition for an optical waveguide gives an optical waveguide that suppresses a decrease of light transmittance with respect to light having a wavelength of 450 nm and that is high in heat resistance.

This is considered to be brought about for a following reason.

An increase in number of double bonds present in a cured product that constitutes an optical waveguide decreases, along with the increase, transmission of light having a wavelength of 450 nm. Specifically, a cured product that constitutes an optical waveguide is retained in a high temperature environment to promote oxidation of a resin that constitutes the cured product, increasing the number of double bonds such as a C=O bond and thus less allowing transmission of light having a wavelength of 450 nm.

Thus, when the difference in light transmittance is 15% or less between before and after retention in a high temperature environment at, for example, 175° C. for 40 hours, oxidation of a resin that constitutes a cured product is suppressed and the increase in the number of double bonds such as a C=O bond is suppressed even in the high temperature environment. For the reason described above, the composition for an optical waveguide according to the present exemplary embodiment sufficiently suppresses oxidation of a resin that constitutes a cured product, the oxidation being likely to occur in an optical waveguide low in heat resistance. Thus, use of the composition for an optical waveguide according to the present exemplary embodiment can produce an optical waveguide high in heat resistance.

The light transmittance of the cured product which is obtained by curing the composition for an optical waveguide into a sheet, with respect to light having a wavelength of 450 nm and in terms of the cured product at a thickness of 50 µm is a value obtained by converting the light transmittance of the cured product with respect to light having a wavelength of 450 nm into the light transmittance of the cured product at a thickness of 50 µm. This light transmittance is obtained as follows, for example. First, the composition for an optical waveguide is cured into a sheet. Light is input into the resultant sheet-like cured product so that the light penetrates the cured product along a thickness direction. Then, measurement is performed for intensity of the light input into the cured product and intensity of light output from the cured product. Next, calculation is performed to obtain a proportion of a difference between the intensity of the light input into the cured product and the intensity of the light output from the cured product, to the intensity of the light input [(intensity of light input−intensity of light output)/intensity of light input×100]. The proportion is defined as the light transmittance. The light transmittance obtained is converted into the light transmittance of the cured product at a thickness of 50 µm. This conversion is performed as follows. First, absorbance A [$A=\log_{10}(T/100)$] is calculated from the obtained light transmittance that is defined as T. Then, absorbance $A_{50}$ (=A/L×50) of the cured product at a thickness of 50 µm is calculated from thickness L of the cured product that has been measured for the light transmittance T. Next calculated is light transmittance $T_{50}$ (=100/10^$A_{50}$) of the cured product with respect to light having a wavelength of 450 nm and in terms of the cured product at a thickness of 50 µm. The light transmittance obtained through the conversion described above is the light transmittance of the cured product, which is obtained by curing the composition for an optical waveguide into a sheet, with respect to light having a wavelength of 450 nm and in terms of the cured product at a thickness of 50 µm.

As described above, the difference in light transmittance with respect to light having a wavelength of 450 nm is 15% or less between the cured product and the cured product after retention in atmosphere at 175° C. for 40 hours, the light transmittance being calculated in terms of the cured product at a thickness of 50 µm. The smaller the difference is, the more preferable the composition for a waveguide is. Accordingly, the difference ranges from 0% to 15%, inclusive, preferably from 1% to 15%, inclusive, more preferably from 1% to 13%, inclusive. Although a smaller difference is more preferable, attempt to reduce the difference excessively decreases options for materials. On the other hand, an excessively large difference decreases heat resistance. Accordingly, when the difference is in the ranges described above, the composition for an optical waveguide is suitably obtained that can produce an optical waveguide high in heat resistance.

The composition for an optical waveguide according to the present exemplary embodiment is not particularly limited as long as the relationship in light transmittance is as described above. Specific examples of the composition for an optical waveguide include a composition containing a liquid aliphatic epoxy compound, a polyfunctional aromatic epoxy compound having three or more epoxy groups in a molecule, a solid bisphenol A type epoxy compound having an epoxy equivalent ranging from 400 g/eq to 1500 g/eq, inclusive, and a photocuring agent. In this composition for an optical waveguide, a content of a liquid bisphenol A type epoxy compound, a phenol novolak type epoxy compound, a cresol novolak type epoxy compound, and a solid alicyclic epoxy compound having three or more epoxy groups in a molecule is 5% by mass or less, relative to a total amount of the epoxy compounds. Such a composition as the composition for an optical waveguide provides a cured product that does not largely change the light transmittance with respect to light having a wavelength of 450 nm, even after retention in atmosphere at 175° C. for 40 hours. That is, such a composition is the composition that gives a cured product having a difference of light transmittance in the ranges described above between before and after retention in atmosphere at 175° C. for 40 hours.

This is considered to be brought about for following reasons.

The liquid aliphatic epoxy compound and the polyfunctional aromatic epoxy compound are structurally less likely to be oxidized even in a high temperature environment. Further, an antioxidant described later effectively acts when added. Accordingly, use of the liquid aliphatic epoxy compound and the polyfunctional aromatic epoxy compound gives a cured product high in heat resistance. That is, a cured product is obtained that sufficiently suppresses a decrease of light transmittance with respect to light having a wavelength of 450 nm even in a high temperature environment. Further, addition of the solid bisphenol A type epoxy compound can, for example, improve patterning by photolithography, suitably forming an optical waveguide. These epoxy compounds are cured with use of the photocuring agent to give a cured product having a difference of light transmittance in the ranges described above between before and after retention in atmosphere at 175° C. for 40 hours. On the other hand, the liquid bisphenol A type epoxy compound, the phenol novolak type epoxy compound, the cresol novolak type epoxy compound, and the solid alicyclic epoxy compound are structurally likely to be oxidized in a high temperature environment. Further, an antioxidant described later is less likely to effectively act even when added. These epoxy compounds can selectively be decreased to suppress a decrease in heat resistance of a cured product obtained. As described above, the composition according to the present exemplary embodiment gives a cured product excellent in heat resistance, that is, a cured product that sufficiently suppresses a decrease of light transmittance with respect to light having a wavelength of 450 nm even in a high temperature environment.

The liquid aliphatic epoxy compound is not particularly limited as long as the compound is liquid and an aliphatic epoxy compound. Specific examples of the liquid aliphatic epoxy compound include 3,4-epoxycyclohexylmethyl(3,4-epoxy)cyclohexane carboxylate and trimethylolpropane polyglycidyl ether. Examples of 3,4-epoxycyclohexylmethyl(3,4-epoxy)cyclohexane carboxylate include CELLOXIDE 2021P manufactured by DAICEL CORPORATION. Examples of trimethylolpropane polyglycidyl ether include YH-300 manufactured by NIPPON STEEL & SUMIKIN CHEMICAL CO., LTD. and EX-321L manufactured by Nagase ChemteX Corporation. As the liquid aliphatic epoxy compound, the compounds exemplified above may be used singly or in combination of two or more of the compounds.

A content of the liquid aliphatic epoxy compound ranges preferably from 10% by mass to 30% by mass, inclusive, more preferably from 15% by mass to 25% by mass, inclusive, relative to the total amount of the epoxy compounds. The liquid aliphatic epoxy compound in an excessively small or large amount makes it difficult to form an optical waveguide. Specifically, the liquid aliphatic epoxy compound in an excessively small amount decreases flexibility of a dry film that is used to form an optical waveguide and is made of the composition for an optical waveguide. The liquid aliphatic epoxy compound in an excessively large amount increases tackiness of a dry film to decrease handleability. For the reasons described above, when the content of the liquid aliphatic epoxy compound is in the ranges described above, an optical waveguide can suitably be formed.

The polyfunctional aromatic epoxy compound is not particularly limited as long as the compound has three or more epoxy groups in a molecule and is an aromatic epoxy compound. Specific examples of the polyfunctional aromatic epoxy compound include 2-[4-(2,3-epoxypropoxy) phenyl]-2-[4-[1,1-bis[4-([2,3-epoxypropoxy]phenyl)]ethyl] phenyl]propane. Further, examples of the functional aromatic epoxy compound include VG3101 manufactured by Printec Corporation.

A content of the polyfunctional aromatic epoxy compound ranges preferably from 10% by mass to 60% by mass, inclusive, more preferably from 20% by mass to 50% by mass, inclusive, further preferably from 25% by mass to 40% by mass, inclusive, relative to the total amount of the epoxy compounds. The polyfunctional aromatic epoxy compound in an excessively small amount decreases the heat resistance of a cured product obtained. The polyfunctional aromatic epoxy compound in an excessively large amount embrittles a cured product. For the reasons described above, when the content of the polyfunctional aromatic epoxy compound is in the ranges described above, an optical waveguide high in heat resistance can suitably be formed.

The solid bisphenol A type epoxy compound is not particularly limited as long as the compound has an epoxy equivalent ranging from 400 g/eq to 1500 g/eq, inclusive, and is a solid bisphenol A type epoxy compound. Examples of the solid bisphenol A type epoxy compound include 1001, 1002, 1003, 1055, 1004, 1004AF, 1003F, 1004F, 1005F, 1004FS, 1006FS, and 1007FS manufactured by Mitsubishi Chemical Corporation. As the solid bisphenol A type epoxy compound, the compounds exemplified above may be used singly or in combination of two or more of the compounds.

The solid bisphenol A type epoxy compound has an epoxy equivalent ranging from 400 g/eq to 1500 g/eq, inclusive, preferably from 670 g/eq to 1100 g/eq, inclusive, more preferably from 900 g/eq to 1100 g/eq, inclusive. The solid bisphenol A type epoxy compound having an excessively small or large epoxy equivalent makes it difficult to form an optical waveguide. Specifically, the solid bisphenol A type epoxy compound having an excessively small epoxy equivalent makes it difficult to form a dry film. The solid bisphenol A type epoxy compound having an excessively large epoxy equivalent is inferior in developability, sometimes not allowing good development for forming a core portion and a clad layer of an optical waveguide. For the reasons described above, when the solid bisphenol A type epoxy compound has an epoxy equivalent in the ranges described above, an optical waveguide can suitably be formed.

A content of the solid bisphenol A type epoxy compound ranges preferably from 10% by mass to 70% by mass, inclusive, more preferably from 20% by mass to 60% by mass, inclusive, further preferably from 25% by mass to 55% by mass, inclusive, relative to the total amount of the epoxy compounds. The solid bisphenol A type epoxy compound in an excessively small or large amount makes it difficult to form an optical waveguide. Specifically, the solid bisphenol A type epoxy compound in an excessively small amount decreases flexibility of a dry film that is used to form an optical waveguide and is made of the composition for an optical waveguide. The solid bisphenol A type epoxy compound in an excessively large amount decreases the heat resistance of a cured product obtained, embrittling the cured product. For the reasons described above, when the content of the liquid aliphatic epoxy compound is in the ranges described above, an optical waveguide can suitably be formed.

The photocuring agent is not particularly limited as long as the photocuring agent can accelerate photocuring of the composition containing the liquid aliphatic epoxy compound, the polyfunctional aromatic epoxy compound, and the solid bisphenol A type epoxy compound. Examples of the photocuring agent include a photo-cationic curing agent and a photo-anionic curing agent.

The photo-cationic curing agent is a polymerization initiator for ring-opening polymerization of an epoxy group in each of the epoxy compounds and is a compound that can initiate a reaction with light. As the photo-cationic curing agent, there can be used, for example, CPI-100P, CPI-101A, and CPI-200K manufactured by San-Apro Ltd., SP-170 manufactured by ADEKA Corporation, and B2380, C1390, D2238, D2960, 10591, M1209, N0137, and T1608 manufactured by Wako Pure Chemical Industries, Ltd. As the photo-cationic curing agent, the compounds exemplified above may be used singly or in combination of two or more of the compounds.

The photo-anionic curing agent is a polymerization initiator for ring-opening polymerization of an epoxy group in each of the epoxy compounds and is a compound that can initiate a reaction with light. As the photo-anionic curing agent, there can be used, for example, A2502, N0528, and O0396 manufactured by Wako Pure Chemical Industries, Ltd. As the photo-anionic curing agent, the compounds exemplified above may be used singly or in combination of two or more of the compounds.

A content of the photocuring agent ranges preferably from 0.3 parts by mass to 5 parts by mass, inclusive, more preferably from 0.5 parts by mass to 2 parts by mass, inclusive, further preferably from 0.5 parts by mass to 1 part by mass, inclusive, relative to a total of 100 parts by mass of the epoxy compounds. The photocuring agent in an excessively small amount makes it difficult to cure the composition for an optical waveguide. The photocuring agent in an excessively large amount excessively generates cations or anions. Excessively generated cations or anions, for example, makes the composition for an optical waveguide excessively likely to be cured, deteriorating preservability and handleability of the composition for an optical waveguide.

Examples of the liquid bisphenol A type epoxy compound include 825, 827, and 828 manufactured by Mitsubishi Chemical Corporation, and 840, 850, and 850S manufactured by DIC Corporation.

Examples of the phenol novolak type epoxy compound include N-740, N-770, and N-775 manufacture by DIC Corporation, and EPPN-501H, EPPN-502H, EPPN-201, and BREN-S manufactured by Nippon Kayaku Co., Ltd.

Examples of the cresol novolak type epoxy compound include EOCN-4600 manufactured by Nippon Kayaku Co., Ltd.

The solid alicyclic epoxy compound has three or more epoxy groups in a molecule, and examples of the solid alicyclic epoxy compound include an adduct of 2,2-bis (hydroxymethyl)-1-butanol with 1,2-epoxy-4-(2-oxiranyl) cyclohexane. Examples of this compound include EHPE3150 manufactured by DAICEL CORPORATION.

As described above, the liquid bisphenol A type epoxy compound, the phenol novolak type epoxy compound, the cresol novolak type epoxy compound, and the solid alicyclic epoxy compound are preferred to be small in content. Specifically, the content of these epoxy compounds is 5% by mass or less, relative to the total amount of the epoxy compounds. These epoxy compounds may be contained as longs as these epoxy compounds are 5% by mass or less but are preferably not contained. That is, the content of these epoxy compounds ranges from 0% by mass to 5% by mass, inclusive, preferably from 0% by mass to 3% by mass, inclusive, more preferably 0% by mass, relative to the total amount of the epoxy compounds. When these epoxy compounds are excessively large in content, it is impossible to sufficiently increase the heat resistance of a cured product obtained.

The composition for an optical waveguide may contain a solid aliphatic epoxy compound having two or more epoxy groups in a molecule. Addition of the solid aliphatic epoxy compound is preferable for obtaining a composition for an optical waveguide particularly preferable for a clad part. For the reason described above, use of the composition for an optical waveguide that contains the solid aliphatic epoxy compound enables suitable production of a clad part of an optical waveguide that is high in heat resistance.

The solid aliphatic epoxy compound is not particularly limited as long as the compound has two or more epoxy groups in a molecule, is solid, and is an aliphatic epoxy compound. For example, a solid hydrogenerated bisphenol A type epoxy compound is preferable. Examples of the solid hydrogenerated bisphenol A type epoxy compound include YX8000, YX8034, and YX8040 that are hydrogenerated bisphenol A type epoxy resins manufactured by Mitsubishi Chemical Corporation, and ST-3000 and ST-4000D manufactured by NIPPON STEEL & SUMIKIN CHEMICAL CO., LTD. As the solid aliphatic epoxy compound, the compounds exemplified above may be used singly or in combination of two or more of the compounds.

A content of the solid aliphatic epoxy compound is preferably 70% by mass or less, relative to the total amount of the epoxy compounds. The solid aliphatic epoxy compound is not necessarily contained and should thus be 0% by mass or more. That is, the content of the solid aliphatic epoxy compound ranges preferably from 0% by mass to 70% by mass, inclusive, more preferably from 10% by mass to 60% by mass, inclusive, further preferably from 20% by mass to 40% by mass, inclusive, relative to the total amount of the epoxy compounds. The solid aliphatic epoxy compound in an excessively small amount reduces an effect brought about by adding the solid aliphatic epoxy compound, for example, an effect of making the composition for an optical waveguide suitable for a clad part. The solid aliphatic epoxy compound in an excessively large amount embrittles a cured product. For the reasons described above, when the content of the solid aliphatic epoxy compound is in the ranges described above, a clad part of an optical waveguide that is high in heat resistance can suitably be formed. The content of the solid aliphatic epoxy compound is preferred to be adjusted together with the contents of the liquid aliphatic epoxy compound, the polyfunctional aromatic epoxy compound, and the solid bisphenol A type epoxy compound so as to provide a refractive index required of a core or a clad part.

The composition for an optical waveguide may contain an antioxidant. The composition for an optical waveguide is preferred to contain an antioxidant for more increasing the heat resistance. The antioxidant is not particularly limited, and there can be used, for example, a phenol antioxidant, a phosphite antioxidant, and a sulfur antioxidant. Examples of the phenol antioxidant include AO-20, AO-30, AO-40, AO-50, AO-60, and AO-80 manufactured by ADEKA Corporation, and SUMILIZER GA-80 manufactured by Sumitomo Chemical Company, Limited. Examples of the phosphite antioxidant include PEP-8, PEP-36, HP-10, 2112, 1178, and 1500 manufactured by ADEKA Corporation, and JP-360 and JP-3CP manufactured by Johoku Chemical Co., Ltd. Examples of the sulfur antioxidant include AO-412S and AO-503 manufactured by ADEKA Corporation, and SUMILIZER TP-D manufactured by Sumitomo Chemical Company, Limited. As the antioxidant, the compounds exemplified above may be used singly or in combination of two or more of the compounds. The phosphite antioxidant and the sulfur antioxidant may possibly cause inhibition of curing, so that the phenol antioxidant is desired to be used singly.

A content of the antioxidant is preferably 5 parts by mass or less, relative to a total of 100 parts by mass of the epoxy compounds. The antioxidant is not necessarily contained and should thus be 0% by mass or more. That is, the content of the antioxidant ranges preferably from 0 parts by mass to 5 parts by mass, inclusive, more preferably from 0.2 parts by mass to 2 parts by mass, inclusive, further preferably from 0.3 parts by mass to 1 part by mass, inclusive, relative to a total of 100 parts by mass of the epoxy compounds. When the antioxidant is contained, the antioxidant in an excessively small or large amount cannot sufficiently increase the heat resistance of a cured product. Specifically, the antioxidant in an excessively small amount is less likely to allow the composition for an optical waveguide to exhibit an effect brought about by adding the antioxidant, not sufficiently increasing the heat resistance of a cured product. The antioxidant in an excessively large amount serves as a plasticizer to decrease the heat resistance of a cured product. For the reasons described above, when the content of the antioxidant is in the ranges described above, a clad part of an optical waveguide that is high in heat resistance can suitably be formed.

As described above, the composition for an optical waveguide according to the present exemplary embodiment is a composition that can produce an optical waveguide high in heat resistance.

Further, the composition for an optical waveguide can be used as a material for a dry film used to produce an optical waveguide.

As described above, the composition for an optical waveguide according to the present exemplary embodiment is cured into a sheet to give a cured product having a difference in light transmittance of 15% or less with respect to light having a wavelength of 450 nm between the cured product and the cured product after retention in atmosphere at 175° C. for 40 hours, the light transmittance being calculated in terms of the cured product at a thickness of 50 µm.

Such a set difference can provide a composition for an optical waveguide that can produce an optical waveguide high in heat resistance.

Specifically, the composition for an optical waveguide provides a cured product that does not largely change, in other words, does not largely decrease the light transmittance with respect to light having a wavelength of 450 nm, even after retention in atmosphere at 175° C. for 40 hours. As described above, by producing an optical waveguide with use of the composition for an optical waveguide that provides a cured product sufficiently suppressing a decrease of light transmittance with respect to light having a wavelength of 450 nm, which is likely to occur when the heat resistance of the cured product is low, the optical waveguide can be made high in heat resistance. For the reasons described above, the set difference gives the composition for an optical waveguide that can produce an optical waveguide high in heat resistance.

The composition for an optical waveguide is preferred to contain the liquid aliphatic epoxy compound, the polyfunctional aromatic epoxy compound having three or more epoxy groups in a molecule, the solid bisphenol A type epoxy compound having an epoxy equivalent ranging from 400 g/eq to 1500 g/eq, inclusive, and the photocuring agent. In addition, the content of the liquid bisphenol A type epoxy compound, the phenol novolak type epoxy compound, the cresol novolak type epoxy compound, and the solid alicyclic epoxy compound having three or more epoxy groups in a molecule is preferably 5% by mass or less, relative to the total amount of the epoxy compounds.

Such composition suitably gives the composition for an optical waveguide that provides a cured product not largely changing the light transmittance with respect to light having a wavelength of 450 nm, even after retention in atmosphere at 175° C. for 40 hours. That is, the composition for an optical waveguide is suitably obtained that provides a cured product having a difference of light transmittance in the ranges described above between before and after retention in atmosphere at 175° C. for 40 hours. For the reasons described above, the composition described above suitably gives the composition for an optical waveguide that can produce an optical waveguide high in heat resistance.

In the composition for an optical waveguide, the content of the liquid aliphatic epoxy compound preferably ranges from 10% by mass to 30% by mass, inclusive, relative to the total amount of the epoxy compounds. The content of the polyfunctional aromatic epoxy compound preferably ranges from 10% by mass to 60% by mass, inclusive, relative to the total amount of the epoxy compounds. The content of the solid bisphenol A type epoxy compound preferably ranges from 10% by mass to 70% by mass, inclusive, relative to the total amount of the epoxy compounds. The content of the photocuring agent preferably ranges from 0.3 parts by mass to 5 parts by mass, inclusive, relative to a total of 100 parts by mass of the epoxy compounds.

Such composition more suitably gives the composition for an optical waveguide that provides a cured product having a change rate of light transmittance in the ranges described above with respect to light having a wavelength of 450 nm, even after retention in atmosphere at 175° C. for 40 hours. For the reason described above, it is possible to more suitably obtain the composition for an optical waveguide that can produce an optical waveguide high in heat resistance.

The composition for an optical waveguide is preferred to further contain the solid aliphatic epoxy compound having two or more epoxy groups in a molecule.

Such composition gives the composition for an optical waveguide that is particularly preferable for a clad part among constituents of an optical waveguide. That is, it is possible to obtain the composition for an optical waveguide that can suitably produce a clad part of an optical waveguide that is high in heat resistance.

In the composition for an optical waveguide, the solid aliphatic epoxy compound is preferred to be a solid hydrogenated bisphenol A type epoxy compound.

Such composition gives the composition for an optical waveguide that can more suitably produce a clad part of an optical waveguide that is high in heat resistance.

In the composition for an optical waveguide, the content of the solid aliphatic epoxy compound is preferably 70% by mass or less, relative to the total amount of the epoxy compounds.

Such composition gives the composition for an optical waveguide that can more suitably produce a clad part of an optical waveguide that is high in heat resistance.

The composition for an optical waveguide is preferred to further contain an antioxidant.

Such composition gives the composition for an optical waveguide that can produce an optical waveguide higher in heat resistance.

In the composition for an optical waveguide, the content of the antioxidant is preferably 5 parts by mass or less, relative to a total of 100 parts by mass of the epoxy compounds.

Such composition gives the composition for an optical waveguide that can produce an optical waveguide higher in heat resistance.

Figure 1:
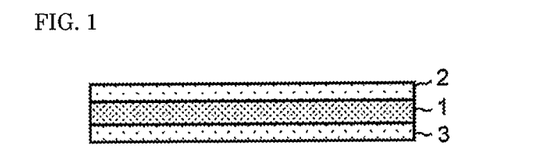
FIG. 1 is a sectional view showing a configuration of a dry film for an optical waveguide according to an exemplary embodiment of the present invention.

A dry film for an optical waveguide according to an exemplary embodiment of the present invention is not particularly limited as long as the dry film includes a layer made of the composition for an optical waveguide. Specific examples of the dry film for an optical waveguide is one including, as shown in FIG. 1, optical waveguide composition layer (layer made of the composition for an optical waveguide) 1, film base material 2 on one surface of the optical waveguide composition layer, and protection film 3 on the other surface of the optical waveguide composition layer. The dry film for an optical waveguide should include at least optical waveguide composition layer 1 and may include not only film base material 2 and protection film 3 but also another layer. Film base material 2 and protection film 3 are not essential. FIG. 1 is a sectional view showing a configuration of the dry film for an optical waveguide according to the present exemplary embodiment.

Film base material 2 is not particularly limited, and examples of the film base material include a polyethylene terephthalate (PET) film, a biaxially stretched polypropylene film, a polyethylene naphthalate film, and a polyimide film. Among these films, a PET film is preferably used.

Protection film 3 is not particularly limited, and examples of the protection film include a polypropylene film.

A method for producing the dry film for an optical waveguide is not particularly limited, and examples of the method include a following method. First, a solvent or the like is added to the composition for an optical waveguide to make a varnish, which is applied onto a film base material. Examples of a method for this application include application with use of a comma coater or the like. This varnish is dried to form an optical waveguide composition layer on the film base material. Further, a protection film is stacked on the optical waveguide composition layer. Examples of a method for stacking the protection film include a thermal lamination method.

The optical waveguide composition layer in the dry film for an optical waveguide is used as a material for an optical waveguide. The dry film for an optical waveguide may be used to produce a core of an optical waveguide or may be used to produce a clad part of an optical waveguide. The composition for an optical waveguide according to the present exemplary embodiment is not necessarily used in the form of a dry film and may be used in the form of, for example, a varnish. In the same manner as in the dry film for an optical waveguide, this composition for an optical waveguide may be used to produce a core of an optical waveguide or may be used to produce a clad part of an optical waveguide. As described above, production of an optical waveguide with use of the composition for an optical waveguide and the dry film for an optical waveguide gives an optical waveguide high in heat resistance.

An optical waveguide according to another exemplary embodiment of the present invention is an optical waveguide which includes a core portion and a clad layer covering the core portion and in which at least one of the core portion and the clad layer is formed of a cured product of the composition for an optical waveguide. Such an optical waveguide is high in heat resistance because the cured product of the composition for an optical waveguide is high in heat resistance. For increasing heat resistance, the optical waveguide is preferable in which both the core portion and the clad layer are formed of a cured product of the composition for an optical waveguide. The optical waveguide obtained as described above can have an increase of waveguide loss of 1 dB/cm or less after a heat treatment at 150° C. for 1000 hours, with respect to waveguide loss before the heat treatment. As described above, it is possible to obtain the optical waveguide high in heat resistance.

A method for producing the optical waveguide is described with reference to FIGS. 2A, 2B, 2C, 2D, 2E, 2F, 2G, and 2H. Described here is a method for producing a photoelectric composite wiring board that includes the optical waveguide. FIGS. 2A to 2H are views for describing the method for producing a photoelectric composite wiring board that includes the optical waveguide according to the present exemplary embodiment.

Figure 2A:
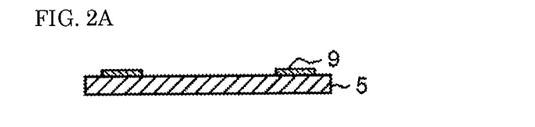
FIG. 2A is a view for describing a method for producing a photoelectric composite wiring board that includes an optical waveguide according to an exemplary embodiment of the present invention.
Figure 2B:
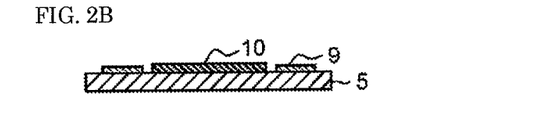
FIG. 2B is a view for describing the method for producing a photoelectric composite wiring board that includes the optical waveguide according to the exemplary embodiment of the present invention.
Figure 2C:
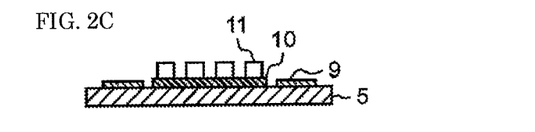
FIG. 2C is a view for describing the method for producing a photoelectric composite wiring board that includes the optical waveguide according to the exemplary embodiment of the present invention.

First, substrate 5 is prepared that includes electric circuit 9, as shown in FIG. 2A. Next, lower clad layer 10 is formed on a surface of substrate 5 on which electric circuit 9 is provided, as shown in FIG. 2B. Next, core portion 11 is formed on lower clad layer 10 as shown in FIG. 2C.

Figure 2D:
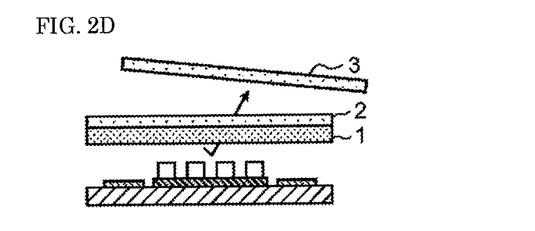
FIG. 2D is a view for describing the method for producing a photoelectric composite wiring board that includes the optical waveguide according to the exemplary embodiment of the present invention.
Figure 2E:
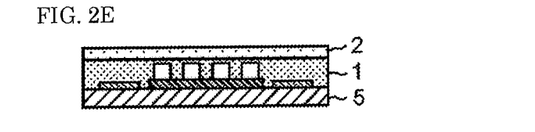
FIG. 2E is a view for describing the method for producing a photoelectric composite wiring board that includes the optical waveguide according to the exemplary embodiment of the present invention.
Figure 2F:
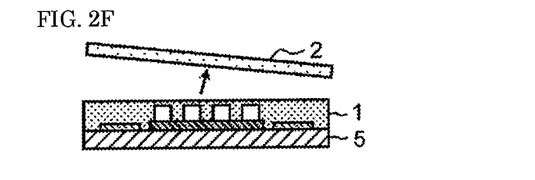
FIG. 2F is a view for describing the method for producing a photoelectric composite wiring board that includes the optical waveguide according to the exemplary embodiment of the present invention.
Figure 2G:
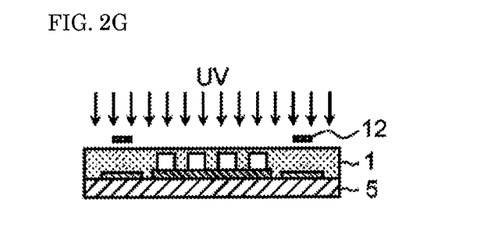
FIG. 2G is a view for describing the method for producing a photoelectric composite wiring board that includes the optical waveguide according to the exemplary embodiment of the present invention.

Next, an upper clad layer is formed with use of the dry film for an optical waveguide. Specifically, protection film 3 is peeled from the dry film for an optical waveguide as shown in FIG. 2D. Then, the dry film for an optical waveguide from which the protection film has been peeled is stacked so that optical waveguide composition layer 1 covers lower clad layer 10 and core portion 11, as shown in FIG. 2E. Then, film base material 2 is peeled from the dry film for an optical waveguide as shown in FIG. 2F. Next, optical waveguide composition layer 1 is irradiated with ultraviolet light to cure the composition for an optical waveguide, as shown in FIG. 2G. Thus, optical waveguide composition layer 1 becomes the upper clad layer.

Figure 2H:
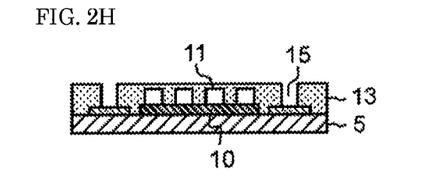
FIG. 2H is a view for describing the method for producing a photoelectric composite wiring board that includes the optical waveguide according to the exemplary embodiment of the present invention.

In the meantime, the optical waveguide composition layer can be irradiated with ultraviolet light through mask 12 as shown in FIG. 2G and then developed to form via 15 as shown in FIG. 2H.

As described above, the optical waveguide can be formed with use of the dry film for an optical waveguide according to the present exemplary embodiment. That is, the optical waveguide shown in FIG. 2H includes core portion 11, lower clad layer 10, and upper clad layer 13. Upper clad layer 13 covers core portion 11. Upper clad layer 13 is a cured product of the composition for an optical waveguide. In the present exemplary embodiment, the dry film for an optical waveguide is used to form upper clad layer 13. The dry film for an optical waveguide, however, may also be used to form lower clad layer 10 or core portion 11.

As described above, the dry film for an optical waveguide according to the present exemplary embodiment is a dry film for an optical waveguide that includes a layer made of the composition for an optical waveguide.

Such a configuration can provide the dry film for an optical waveguide that can produce the optical waveguide high in heat resistance.

The optical waveguide according to the present exemplary embodiment is an optical waveguide which includes a core portion and a clad layer covering the core portion and in which at least one of the core portion and the clad layer is formed of a cured product of the composition for an optical waveguide.

Such a configuration can provide the optical waveguide high in heat resistance.

The optical waveguide preferably has an increase of waveguide loss of 1 dB/cm or less after a heat treatment at 150° C. for 1000 hours, with respect to waveguide loss before the heat treatment.

Such a set increase gives the optical waveguide higher in heat resistance.

Hereinafter, the present invention is more specifically described with reference to examples. A scope of the present invention is not limited to these examples.

EXAMPLES

First, materials used in the present examples are collectively indicated below.

[A: Liquid Aliphatic Epoxy Compound]
CELLOXIDE 2021P: liquid aliphatic epoxy compound manufactured by DAICEL CORPORATION
YH-300: liquid aliphatic epoxy compound manufactured by NIPPON STEEL & SUMIKIN CHEMICAL CO., LTD.
[B: Polyfunctional Aromatic Epoxy Compound]
VG3101: trifunctional aromatic epoxy compound manufactured by Printec Corporation
[C: Solid bisphenol A Type Epoxy Compound]
1006FS: solid bisphenol A type epoxy compound (epoxy equivalent 900 g/eq to 1100 g/eq) manufactured by Mitsubishi Chemical Corporation
1003: solid bisphenol A type epoxy compound (epoxy equivalent 670 g/eq to 770 g/eq) manufactured by Mitsubishi Chemical Corporation
YP-50: solid bisphenol A type epoxy compound (epoxy equivalent 6000 g/eq or more) manufactured by NIPPON STEEL & SUMIKIN CHEMICAL CO., LTD.
[D: Liquid Bisphenol A Type Epoxy Compound]
850S: liquid bisphenol A type epoxy compound (epoxy equivalent 184 g/eq to 194 g/eq) manufactured by DIC Corporation
[E: Phenol Novolak Type Epoxy Compound]
EPPN-201: phenol novolak type epoxy compound (solid) manufactured by Nippon Kayaku Co., Ltd.
[F: Cresol Novolak Epoxy Compound]
EOCN-4600: cresol novolak epoxy compound manufactured by Nippon Kayaku Co., Ltd.
[G: Solid Alicyclic Epoxy Compound]
EHPE3150: adduct of 2,2-bis(hydroxymethyl)-1-butanol with 1,2-epoxy-4-(2-oxiranyl)cyclohexane (epoxy equivalent 900 g/eq to 1500 g/eq) manufactured by DAICEL CORPORATION
[H: Solid Aliphatic Epoxy Compound]
YX8040: hydrogenated bisphenol A type epoxy compound manufactured by Mitsubishi Chemical Corporation
[Photocuring Agent]
SP-170: photo-cationic curing agent manufactured by ADEKA Corporation

[Antioxidant]

AO-60: antioxidant manufactured by ADEKA Corporation

Examples 1 to 28 and Comparative Examples 1 to 5

Compositions according to Examples 1 to 28 and Comparative Examples 1 to 5 are prepared as follows. First, materials are weighed into a glass container so as to give blending amounts (part by mass) shown in (Tables 1 and 2), and 2-butanone and toluene are added as solvents to the glass container. The blended material is stirred under reflux at 80° C. This procedure dissolves all dissoluble solid contents to give a uniform varnish composition. The resultant varnish composition is filtrated with a membrane filter that is made of polytetrafluoroethylene (PTFE) and has a pore size of 1 μm. The filtration removes a solid foreign substance that is contained. Hereinafter, the varnish composition is used that has been obtained through the filtration.

Next, dry films are manufactured with use of the compositions according to Examples 1 to 28 and Comparative Examples 1 to 5. The resultant varnish composition is applied onto a film base material, or a PET film (A4100 manufactured by TOYOBO CO., LTD.) with use of a comma coater head-equipped multicoater manufactured by HIRANO TECSEED Co., Ltd. so as to give a layer that is made of the composition and has a thickness of 25 μm, and then the layer is dried at 125° C. Thus, the layer that has a thickness of 25 μm and is made of the composition is formed on the PET film. An oriented polypropylene film is, as a protection film, thermally laminated on the layer made of the composition. Thus, a dry film is obtained.

Hereinafter, following evaluations are performed for the resultant compositions and dry films.

[Light Transmittance 1 (Initial)]

Measurement for light transmittance is performed as follows.

First, the dry film including the layer that has a thickness of 25 μm and is made of the composition is cut out into two dry films having a size of 100 mm×100 mm. The protection film is peeled from each of the dry films, and the dry films are put together, with the peeled surfaces facing each other, and subjected to vacuum lamination. At this time, the dry films are subjected to vacuum lamination with use of V-130 manufactured by Nichigo-Morton Co., Ltd. under conditions of 50° C. and 0.3 MPa. Thus, a dry film is obtained that is sandwiched between the film base materials, or the PET films on both sides and has a thickness of 50 μm. A PET surface of either one of the PET films is irradiated with ultraviolet light at 2 J/cm$^2$. Then, the PET film whose surface has been exposed is peeled, and the dry film is heated at 150° C. for 1 hour. Then, the other PET film is peeled to give a cured film obtained by curing the layer singly made of the composition in the dry film. The cured film is used to measure light transmittance (light transmittance 1) with respect to light having a wavelength of 450 nm, by an ultraviolet visible light spectrophotometer manufactured by SHIMADZU CORPORATION. A dry film that does not have a thickness of 50 μm can be compared by changing measured transmittance into absorbance per unit thickness and converting the absorbance into transmittance at 50 μm.

[Light Transmittance 2 (After Retention at 175° C. for 40 Hours)]

The cured film obtained as described above is left to stand still in a drier at 175° C. for 40 hours. Then, the cured film is left to stand still outside the drier until the cured film cools to room temperature. Light transmittance (light transmittance 2) of this cured film is measured in the same manner as the method for measuring the light transmittance described above.

[Difference in Light Transmittance (Light Transmittance 1–Light Transmittance 2)]

A difference (light transmittance 1–light transmittance 2) is calculated from light transmittances 1 and 2 acquired as described above. A calculated value serves as an index for heat resistance.

[Refractive Index]

The cured film obtained as described above is used to measure a refractive index with use of a refractometer manufactured by ATAGO CO., LTD.

[Glass Transition Temperature (Tg)]

The cured film obtained as described above is used to measure a temperature at which a complex modulus (E") is peak with use of a viscoelastic spectrometer (DMS200) manufactured by Seiko Instruments Inc., the temperature being defined as Tg.

[Developability]

An optical waveguide described later is manufactured with use of the dry film obtained as described above. A core width is evaluated as "OK" when formed in a range of ±10% with respect a predetermined core width and is otherwise evaluated as "NG."

As regards Examples 14 to 28 and Comparative Examples 4 and 5, the dry film is used for a clad part and therefore is not evaluated for developability. As regards Examples 1 to 13 and Comparative Examples 1 to 3, the dry film is used for a core.

(Tables 1 and 2) show results of these evaluations together with the blending amounts of the compositions.

TABLE 1

| | | | | | EXAMPLE | | | | | | | |
|---|---|---|---|---|---|---|---|---|---|---|---|---|
| | | | | | 1 | 2 | 3 | 4 | 5 | 6 | 7 | 8 |
| BLENDING AMOUNT (PART BY MASS) | EPOXY COMPOUND | A | CELLOXIDE 2021P | | 10 | 20 | 30 | 20 | 20 | 20 | 20 | — |
| | | | YH-300 | | — | — | — | — | — | — | — | 15 |
| | | B | VG3101 | | 50 | 25 | 40 | 25 | 25 | 25 | 25 | 25 |
| | | C | 1006FS | 900-1100 | 40 | 55 | 30 | 55 | 55 | 55 | 55 | 60 |
| | | | 1003 | 670-770 | — | — | — | — | — | — | — | — |
| | | | VP-50 | 6000 or more | — | — | — | — | — | — | — | — |
| | | D | 850S | | — | — | — | — | — | — | — | — |
| | | E | EPPN-201 | | — | — | — | — | — | — | — | — |
| | | F | EOCN-4600 | | — | — | — | — | — | — | — | — |
| | | G | EHPE3150 | | — | — | — | — | — | — | — | — |
| | PHOTOCURING AGENT | | SP-170 | | 1 | 1 | 1 | 1 | 1 | 0.5 | 2 | 1 |
| | ANTIOXIDANT | | AO-60 | | — | — | — | 1 | 2 | 0.8 | 0.3 | 0.3 |

TABLE 1-continued

| EVALUATION | LIGHT TRANSMITTANCE 1 (INITIAL) (%) | 91 | 91 | 91 | 91 | 91 | 91 | 91 | 91 |
|---|---|---|---|---|---|---|---|---|---|
| | LIGHT TRANSMITTANCE 2 (AFTER RETENTION AT 175° C. FOR 40 HOURS) (%) | 84 | 86 | 83 | 91 | 91 | 91 | 90 | 90 |
| | DIFFERENCE (LIGHT TRANSMITTANCE 1 − LIGHT TRANSMITTANCE 2) (%) | 7 | 6 | 8 | 0 | 0 | 0 | 1 | 1 |
| | REFRACTIVE INDEX (%) | 1.589 | 1.582 | 1.571 | 1.581 | 1.584 | 1.582 | 1.584 | 1.584 |
| | Tg (° C.) | 154 | 160 | 164 | 160 | 159 | 158 | 160 | 155 |
| | DEVELOPABILITY | OK | OK | OK | OK | OK | OK | OK | OK |

| | | | | | EXAMPLE | | | | | COMPARATIVE EXAMPLE | | |
|---|---|---|---|---|---|---|---|---|---|---|---|---|
| | | | | 9 | 10 | 11 | 12 | 13 | 1 | 2 | 3 |
| BLENDING AMOUNT (PART BY MASS) | EPOXY COMPOUND | A | CELLOXIDE 2021P | | 18 | 15 | 20 | 20 | 20 | 15 | 15 | 10 |
| | | | YH-300 | | — | — | — | — | — | — | — | — |
| | | B | VG3101 | | 25 | 25 | 25 | 25 | 25 | 25 | 15 | 15 |
| | | C | 1006FS | 900-1100 | 35 | 55 | 50 | 50 | 50 | 40 | 60 | 35 |
| | | | 1003 | 670-770 | 22 | — | — | — | — | — | — | — |
| | | | VP-50 | 6000 or more | — | — | — | — | — | — | — | — |
| | | D | 850S | | — | — | 5 | — | — | 20 | — | 10 |
| | | E | EPPN-201 | | — | 5 | — | — | — | — | 10 | 20 |
| | | F | EOCN-4600 | | — | — | — | 5 | — | — | — | — |
| | | G | EHPE3150 | | — | — | — | — | 5 | — | — | 10 |
| | PHOTOCURING AGENT | | SP-170 | | 1 | 1 | 1 | 1 | 1 | 1 | 1 | 1 |
| | ANTIOXIDANT | | AO-60 | | 0.3 | — | — | — | — | 0.3 | 0.3 | 0.3 |
| EVALUATION | LIGHT TRANSMITTANCE 1 (INITIAL) (%) | | | | 91 | 91 | 91 | 91 | 91 | 90 | 90 | 90 |
| | LIGHT TRANSMITTANCE 2 (AFTER RETENTION AT 175° C. FOR 40 HOURS) (%) | | | | 90 | 81 | 83 | 79 | 79 | 71 | 73 | 73 |
| | DIFFERENCE (LIGHT TRANSMITTANCE 1 − LIGHT TRANSMITTANCE 2) (%) | | | | 1 | 10 | 8 | 12 | 12 | 19 | 17 | 16 |
| | REFRACTIVE INDEX (%) | | | | 1.583 | 1.586 | 1.584 | 1.583 | 1.583 | 1.584 | 1.584 | 1.581 |
| | Tg (° C.) | | | | 158 | 167 | 170 | 169 | 170 | 155 | 162 | 166 |
| | DEVELOPABILITY | | | | OK | OK | OK | OK | OK | OK | OK | OK |

TABLE 2

| | | | | | EXAMPLE | | | | | | | | |
|---|---|---|---|---|---|---|---|---|---|---|---|---|---|
| | | | | | 14 | 15 | 16 | 17 | 18 | 19 | 20 | 21 | 22 |
| BLENDING AMOUNT (PART BY MASS) | EPOXY COMPOUND | A | CELLOXIDE 2021P | | 10 | 15 | 30 | 15 | 20 | 15 | 15 | 15 | 15 |
| | | | YH-300 | | — | — | — | — | — | — | — | — | — |
| | | B | VG3101 | | 25 | 25 | 25 | 40 | 10 | 25 | 25 | 25 | 25 |
| | | C | 1006FS | 900-1100 | 25 | 25 | 25 | 10 | 50 | 25 | 25 | 25 | 25 |
| | | | 1003 | 670-770 | — | — | — | — | — | — | — | — | — |
| | | | YP-50 | 6000 or more | — | — | — | — | — | — | — | — | — |
| | | D | 850S | | — | — | — | — | — | — | — | — | — |
| | | E | EPPN-201 | | — | — | — | — | — | — | — | — | — |
| | | F | EOCN-4600 | | — | — | — | — | — | — | — | — | — |
| | | G | EHPE3150 | | — | — | — | — | — | — | — | — | — |
| | | H | YX8040 | 900-1500 | 40 | 35 | 20 | 35 | 20 | 35 | 35 | 35 | 35 |
| | PHOTOCURING AGENT | | SP-170 | | 1 | 1 | 1 | 1 | 1 | 1 | 1 | 0.5 | 2 |
| | ANTIOXIDANT | | AO-60 | | — | — | — | — | — | 1 | 2 | 0.3 | 0.3 |
| EVALUATION | LIGHT TRANSMITTANCE 1 (INITIAL) (%) | | | | 93 | 93 | 93 | 93 | 92 | 93 | 93 | 93 | 93 |
| | LIGHT TRANSMITTANCE 2 (AFTER RETENTION AT 175° C. FOR 40 HOURS) (%) | | | | 86 | 86 | 87 | 85 | 88 | 93 | 92 | 93 | 93 |
| | DIFFERENCE (LIGHT TRANSMITTANCE 1 − LIGHT TRANSMITTANCE 2) (%) | | | | 7 | 7 | 6 | 8 | 4 | 0 | 1 | 0 | 0 |
| | REFRACTIVE INDEX (%) | | | | 1.553 | 1.554 | 1.554 | 1.552 | 1.570 | 1.554 | 1.553 | 1.551 | 1.554 |
| | Tg (° C.) | | | | 149 | 152 | 158 | 154 | 145 | 154 | 152 | 149 | 153 |

TABLE 2-continued

|  |  |  |  | EXAMPLE | | | | | | COMPARATIVE EXAMPLE | |
|---|---|---|---|---|---|---|---|---|---|---|---|
|  |  |  |  | 23 | 24 | 25 | 26 | 27 | 28 | 4 | 5 |
| BLENDING AMOUNT (PART BY MASS) | EPOXY COMPOUND | A | CELLOXIDE 2021P | — | 15 | 15 | 10 | 15 | 15 | 15 | — |
|  |  |  | YH-300 | 15 | — | — | — | — | — | — | 10 |
|  |  | B | VG3101 | 25 | 25 | 25 | 25 | 25 | 25 | 25 | — |
|  |  | C | 1006FS 900-1100 | 25 | — | 20 | 25 | 20 | 20 | 25 | 10 |
|  |  |  | 1003 670-770 | — | 25 | — | — | — | — | — | — |
|  |  |  | VP-50 6000 or more | — | — | — | — | — | — | — | 20 |
|  |  | D | 850S | — | — | — | 5 | — | — | — | — |
|  |  | E | EPPN-201 | — | — | 5 | — | — | — | — | — |
|  |  | F | EOCN-4600 | — | — | — | — | 5 | — | — | — |
|  |  | G | EHPE3150 | — | — | — | — | — | 5 | 35 | 60 |
|  |  | H | YX8040 900-1500 | 35 | 35 | 35 | 35 | 35 | 35 | — | — |
|  | PHOTOCURING AGENT | | SP-170 | 1 | 1 | 1 | 1 | 1 | 1 | 1 | 1 |
|  | ANTIOXIDANT | | AO-60 | 0.3 | 0.3 | — | — | — | — | 0.3 | 0.3 |
| EVALUATION | LIGHT TRANSMITTANCE 1 (INITIAL) (%) | | | 92 | 92 | 93 | 91 | 93 | 93 | 91 | 93 |
|  | LIGHT TRANSMITTANCE 2 (AFTER RETENTION AT 175° C. FOR 40 HOURS) (%) | | | 91 | 91 | 80 | 83 | 80 | 80 | 68 | 75 |
|  | DIFFERENCE (LIGHT TRANSMITTANCE 1 − LIGHT TRANSMITTANCE 2) (%) | | | 1 | 1 | 13 | 8 | 13 | 13 | 23 | 19 |
|  | REFRACTIVE INDEX (%) | | | 1.554 | 1.554 | 1.553 | 1.556 | 1.554 | 1.550 | 1.582 | 1.540 |
|  | Tg (° C.) | | | 153 | 152 | 154 | 152 | 154 | 157 | 160 | 170 |

As understood from (Tables 1 and 2), the cured products of the compositions according to Examples 1 to 28 are higher in light transmittance after retention at 175° C. for 40 hours than the cured products according to Comparative Examples 1 to 6. This result demonstrates that the cured products according to the examples are high in heat resistance, in other words, capable of maintaining transparency even in a high temperature environment. This result demonstrates that the blending amounts as in Examples 1 to 28 can give a dry film that becomes a cured product excellent in heat resistance.

In contrast, the compositions according to Comparative Examples 1 to 5 contain excessively large amounts of the liquid bisphenol A type epoxy compound, the phenol novolak type epoxy compound, the cresol novolak type epoxy compound, and the solid alicyclic epoxy compound having three or more epoxy groups in a molecule. As a result, the cured products are inferior in heat resistance and cannot sufficiently suppress a decrease of light transmittance after retention at 175° C. for 40 hours.

In the meantime, use of a solid bisphenol A type epoxy compound having an epoxy equivalent of more than 1500, e.g., 1007 (epoxy equivalent 1750 g/eq to 2200 g/eq) manufactured by Mitsubishi Chemical Corporation deteriorates developability, making it difficult to form a suitable optical waveguide.

Examples 29 to 41 and Comparative Examples 6 to 8

Optical waveguides according to Examples 29 to 41 and Comparative Examples 6 to 8 are formed in a following manner.

A dry film for a clad part having a thickness of 35 μm is stacked on a substrate (1515W manufactured by Panasonic Corporation) from both surfaces of which copper is etched off, and subjected to lamination by a vacuum laminator. A base material, or a PET film is irradiated with ultraviolet light and peeled, and then the dry film is heated at 140° C. to form an under clad part (lower clad part).

Next, a dry film for a core having a thickness of 25 μm is stacked on a surface of the under clad part and subjected to lamination by a vacuum laminator.

An exposure mask for forming an opening in a linear pattern having a width of 25 μm and a length of 50 mm is overlaid on a surface of the dry film for a core that is to be laminated, and irradiation with ultraviolet light is performed. Then, a heat treatment is performed at 140° C. to cure an exposed portion of the dry film for a core.

Next, development is performed with use of an aqueous flux cleaning agent (PINE ALPHA ST-100SX manufactured by ARAKAWA CHEMICAL INDUSTRIES, LTD.) to remove an uncured portion of the dry film for a core. Then, air blowing and drying are performed to form a core.

Next, a dry film for a clad part having a thickness of 35 μm is stacked on the core and subjected to lamination by a vacuum laminator. The dry film for a clad part is irradiated with ultraviolet light and then heated at 140° C. to cure the dry film for a clad part.

The substrate is cut so as to give a length of 50 mm as a waveguide pattern, and end surfaces of the substrate are polished to give a sample (specimen) including a formed optical waveguide for evaluation.

Used as the dry film for a clad part and the dry film for a core in each of the examples and comparative examples are the dry films according to the examples and comparative examples indicated in (Table 3).

The resultant optical waveguides are evaluated as follows.

[Initial Wave Guide Loss]

Light that has a wavelength of 850 nm and is emitted from a light source, or a vertical cavity surface emitting laser (VCSEL) is allowed to enter from an optical fiber having a core diameter of 10 μm and a numerical aperture (NA) of 0.21, to either one of the end surfaces of the waveguide, and to be output through an optical fiber having a core diameter of 200 μm and an NA of 0.4, and power (P1) of the output light is measured with a power meter. On the other hand, power (P0) is measured with a power meter while both the optical fibers are put together with their end surfaces facing each other to make a state of absence of the optical waveguide. Optical loss (waveguide loss) of the optical waveguide is derived from a formula $-10 \times \log(P1/P0)$.

[Amount of Change in Waveguide Loss After Reflow]

The resultant optical waveguide is measured for waveguide loss after subjected to reflow three times under a reflow condition of lead-free solder. Calculation is performed to obtain an amount of change from the initial waveguide loss to this waveguide loss.

[Amount of Change in Waveguide Loss After Retention at 175° C. for 40 Hours]

The resultant optical waveguide is measured for waveguide loss after left to stand still in an environment at 175° C. for 40 hours. Calculation is performed to obtain an amount of change from the initial waveguide loss to this waveguide loss.

[Amount of Change in Waveguide Loss After Retention at 150° C. for 1000 Hours]

The resultant optical waveguide was measured for waveguide loss after left to stand still in an environment at 150° C. for 1000 hours. Calculation is performed to obtain an amount of change from the initial waveguide loss to this waveguide loss. When the waveguide loss rises as high as the measurement for this waveguide loss cannot be performed, (Table 3) denotes "unmeasurable."

(Table 3) shows these results together with the dry films used.

TABLE 3

|  | EXAMPLE 29 | EXAMPLE 30 | EXAMPLE 31 | EXAMPLE 32 |
|---|---|---|---|---|
|  |  |  | CORE |  |
|  | EXAMPLE 1 | EXAMPLE 2 | EXAMPLE 3 | EXAMPLE 4 |
|  |  |  | CLAD PART |  |
|  | EXAMPLE 14 | EXAMPLE 15 | EXAMPLE 18 | EXAMPLE 19 |
| INITIAL WAVEGUIDE LOSS (dB/5 cm) | 0.25 | 0.24 | 0.25 | 0.25 |
| AMOUNT OF CHANGE IN WAVEGUIDE LOSS AFTER REFLOW (dB/cm) | +0.02 | +0.02 | +0.01 | +0.00 |
| AMOUNT OF CHANGE IN WAVEGUIDE LOSS AFTER RETENTION AT 175° C. FOR 40 HOURS (dB/cm) | +0.04 | +0.04 | +0.04 | +0.02 |
| AMOUNT OF CHANGE IN WAVEGUIDE LOSS AFTER RETENTION AT 150° C. FOR 1000 HOURS (dB/cm) | +0.81 | +0.81 | +0.79 | +0.56 |
|  | EXAMPLE 37 | EXAMPLE 38 | EXAMPLE 39 | EXAMPLE 40 |
|  |  |  | CORE |  |
|  | EXAMPLE 9 | EXAMPLE 10 | EXAMPLE 11 | EXAMPLE 12 |
|  |  |  | CLAD PART |  |
|  | EXAMPLE 24 | EXAMPLE 25 | EXAMPLE 26 | EXAMPLE 27 |
| INITIAL WAVEGUIDE LOSS (dB/5 cm) | 0.23 | 0.24 | 0.24 | 0.26 |
| AMOUNT OF CHANGE IN WAVEGUIDE LOSS AFTER REFLOW (dB/cm) | +0.01 | +0.02 | +0.02 | +0.01 |
| AMOUNT OF CHANGE IN WAVEGUIDE LOSS AFTER RETENTION AT 175° C. FOR 40 HOURS (dB/cm) | +0.02 | +0.05 | +0.05 | +0.04 |
| AMOUNT OF CHANGE IN WAVEGUIDE LOSS AFTER RETENTION AT 150° C. FOR 1000 HOURS (dB/cm) | +0.65 | +0.98 | +0.92 | +0.89 |
|  | EXAMPLE 33 | EXAMPLE 34 | EXAMPLE 35 | EXAMPLE 36 |
|  |  |  | CORE |  |
|  | EXAMPLE 5 | EXAMPLE 6 | EXAMPLE 7 | EXAMPLE 8 |
|  |  |  | CLAD PART |  |
|  | EXAMPLE 20 | EXAMPLE 21 | EXAMPLE 22 | EXAMPLE 23 |
| INITIAL WAVEGUIDE LOSS (dB/5 cm) | 0.26 | 0.22 | 0.27 | 0.24 |
| AMOUNT OF CHANGE IN WAVEGUIDE LOSS AFTER REFLOW (dB/cm) | +0.00 | +0.01 | +0.01 | +0.02 |
| AMOUNT OF CHANGE IN WAVEGUIDE LOSS AFTER RETENTION AT 175° C. FOR 40 HOURS (dB/cm) | +0.01 | +0.02 | +0.02 | +0.05 |
| AMOUNT OF CHANGE IN WAVEGUIDE LOSS AFTER RETENTION AT 150° C. FOR 1000 HOURS (dB/cm) | +0.4 | +0.50 | +0.65 | +0.92 |

TABLE 3-continued

|  | EXAMPLE 41 | COMPARATIVE EXAMPLE 6 | COMPARATIVE EXAMPLE 7 | COMPARATIVE EXAMPLE 8 |
|---|---|---|---|---|
|  |  | CORE | | |
|  | EXAMPLE 13 | COMPARATIVE EXAMPLE 1 | COMPARATIVE EXAMPLE 2 | COMPARATIVE EXAMPLE 3 |
|  |  | CLAD PART | | |
|  | EXAMPLE 28 | COMPARATIVE EXAMPLE 4 | COMPARATIVE EXAMPLE 4 | COMPARATIVE EXAMPLE 6 |
| INITIAL WAVEGUIDE LOSS (dB/5 cm) | 0.23 | 0.25 | 0.25 | 0.28 |
| AMOUNT OF CHANGE IN WAVEGUIDE LOSS AFTER REFLOW (dB/cm) | +0.02 | +0.05 | +0.05 | +0.10 |
| AMOUNT OF CHANGE IN WAVEGUIDE LOSS AFTER RETENTION AT 175° C. FOR 40 HOURS (dB/cm) | +0.06 | +0.04 | +0.04 | +0.6 |
| AMOUNT OF CHANGE IN WAVEGUIDE LOSS AFTER RETENTION AT 150° C. FOR 1000 HOURS (dB/cm) | +0.95 | +2.2 | +2.4 | UNMEASURABLE |

As understood from (Table 3), the optical waveguides (Examples 29 to 41) obtained with use of the dry films according to Examples 1 to 28 can more suppress a rise of waveguide loss in a high temperature environment than the optical waveguides (Comparative Examples 6 to 8) obtained with use of the dry films according to Comparative. Examples 1 to 5. Specifically, the optical waveguides according to Examples 29 to 41 are small in variation of waveguide loss under the reflow condition of lead-free solder. Further, the optical waveguides according to Examples 29 to 41 are smaller in variation of waveguide loss in the high temperature environments at 175° C. and 150° C. than the optical waveguides according to Comparative Examples 6 to 8. For the reasons described above, the optical waveguides according to Examples 29 to 41 have as high heat resistance as a rise of waveguide loss can sufficiently be suppressed for a longer period in environments at 125° C. or 105° C.

In contrast, the optical waveguides according to Comparative Examples 6 to 8 that include for the core and the clad part the dry films inferior in heat resistance have a very large variation of waveguide loss not only after the reflow but also in the high temperature environment at 175° C. Particularly, in Comparative Example 8, the waveguide loss after retention at 150° C. for 1000 hours is as high as the measurement cannot be performed, and the optical waveguide according to Comparative Example 8 is largely inferior in heat resistance to the optical waveguides according to Examples 29 to 41.

As described above, use of the dry film that includes a layer made of the composition according to the present exemplary embodiment can produce the optical waveguide excellent in heat resistance.

INDUSTRIAL APPLICABILITY

A composition for an optical waveguide according to the present invention is excellent in heat resistance and is thus useful to produce an optical waveguide.

REFERENCE MARKS IN THE DRAWINGS 1 optical waveguide composition layer
2 film base material
3 protection film
5 substrate
9 electric circuit
10 lower clad layer
11 core portion
12 mask
13 upper clad layer
15 via

The invention claimed is:

1. A composition for an optical waveguide comprising:
   a liquid aliphatic epoxy compound;
   a polyfunctional aromatic epoxy compound having three or more epoxy groups in a molecule;
   a solid bisphenol A type epoxy compound having an epoxy equivalent ranging from 400 g/eq to 1500 g/eq, inclusive; and
   a photocuring agent,
   wherein a content of a liquid bisphenol A type epoxy compound, a phenol novolak type epoxy compound, a cresol novolak type epoxy compound, and a solid alicyclic epoxy compound having three or more epoxy groups in a molecule is 5% by mass or less, relative to a total amount of the epoxy compounds.

2. The composition for an optical waveguide according to claim 1, wherein
   a content of the liquid aliphatic epoxy compound ranges from 10% by mass to 30% by mass, inclusive, relative to the total amount of the epoxy compounds,
   a content of the polyfunctional aromatic epoxy compound ranges from 10% by mass to 60% by mass, inclusive, relative to the total amount of the epoxy compounds,
   a content of the solid bisphenol A type epoxy compound ranges from 10% by mass to 70% by mass, inclusive, relative to the total amount of the epoxy compounds, and
   a content of the photocuring agent ranges from 0.3 parts by mass to 5 parts by mass, inclusive, relative to a total of 100 parts by mass of the epoxy compounds.

3. The composition for an optical waveguide according to claim 1,
   further comprising a solid aliphatic epoxy compound having two or more epoxy groups in a molecule.

4. The composition for an optical waveguide according to claim 3,
   wherein the solid aliphatic epoxy compound is a solid hydrogenerated bisphenol A type epoxy compound.

5. The composition for an optical waveguide according to claim 3,
wherein a content of the solid aliphatic epoxy compound is 70% by mass or less, relative to the total amount of the epoxy compounds.

6. The composition for an optical waveguide according to claim 1, further comprising an antioxidant.

7. The composition for an optical waveguide according to claim 6, wherein a content of the antioxidant is 5 parts by mass or less relative to a total of 100 parts by mass of the epoxy compounds.

* * * * *